(12) United States Patent
Stewart et al.

(10) Patent No.: US 7,728,587 B2
(45) Date of Patent: Jun. 1, 2010

(54) SELF-CALIBRATING NUCLEAR MAGNETIC RESONANCE GYRO

(75) Inventors: Robert E. Stewart, Woodland Hills, CA (US); Edward Kanegsberg, Pacific Palisades, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 102 days.

(21) Appl. No.: 11/888,280

(22) Filed: Jul. 31, 2007

(65) Prior Publication Data

US 2009/0033329 A1  Feb. 5, 2009

(51) Int. Cl.
*G01V 3/00* (2006.01)
(52) U.S. Cl. .......................... 324/304; 324/301
(58) Field of Classification Search ............. 324/304, 324/301
See application file for complete search history.

(56) References Cited

U.S. PATENT DOCUMENTS 4,157,495 A * 6/1979 Grover et al. ............... 324/302
5,562,266 A * 10/1996 Achkar et al. ............... 244/171
6,882,964 B2 * 4/2005 Bayard et al. ............... 702/191
7,239,135 B2 * 7/2007 Abbink et al. ............... 324/304
7,282,910 B1 * 10/2007 Kanegsberg ................. 324/304
7,328,104 B2 * 2/2008 Overstreet et al. ........... 701/220
7,437,224 B2 * 10/2008 Tsao et al. ..................... 701/13

* cited by examiner

*Primary Examiner*—Louis M Arana
(74) *Attorney, Agent, or Firm*—Carmen Patti Law Group, LLC

(57) ABSTRACT

The method and apparatus in one embodiment may have: a gyro housing containing a bias field; a bias field that generates a stable axial magnetic field; Xenon or other gas contained within at least a portion of the axial magnetic field, Xenon or other gas nuclear spins precessing at a constant angular rate with respect to the gyro housing in response to the axial magnetic field; wherein reversing a polarity of the bias field reverses a polarity of the magnetic field and a polarity of the precession of the Xenon or other gas nuclear spin, and wherein a reversing of the polarity of the gyro scalefactor thereby results without reversing a polarity of the gyro bias.

20 Claims, 4 Drawing Sheets

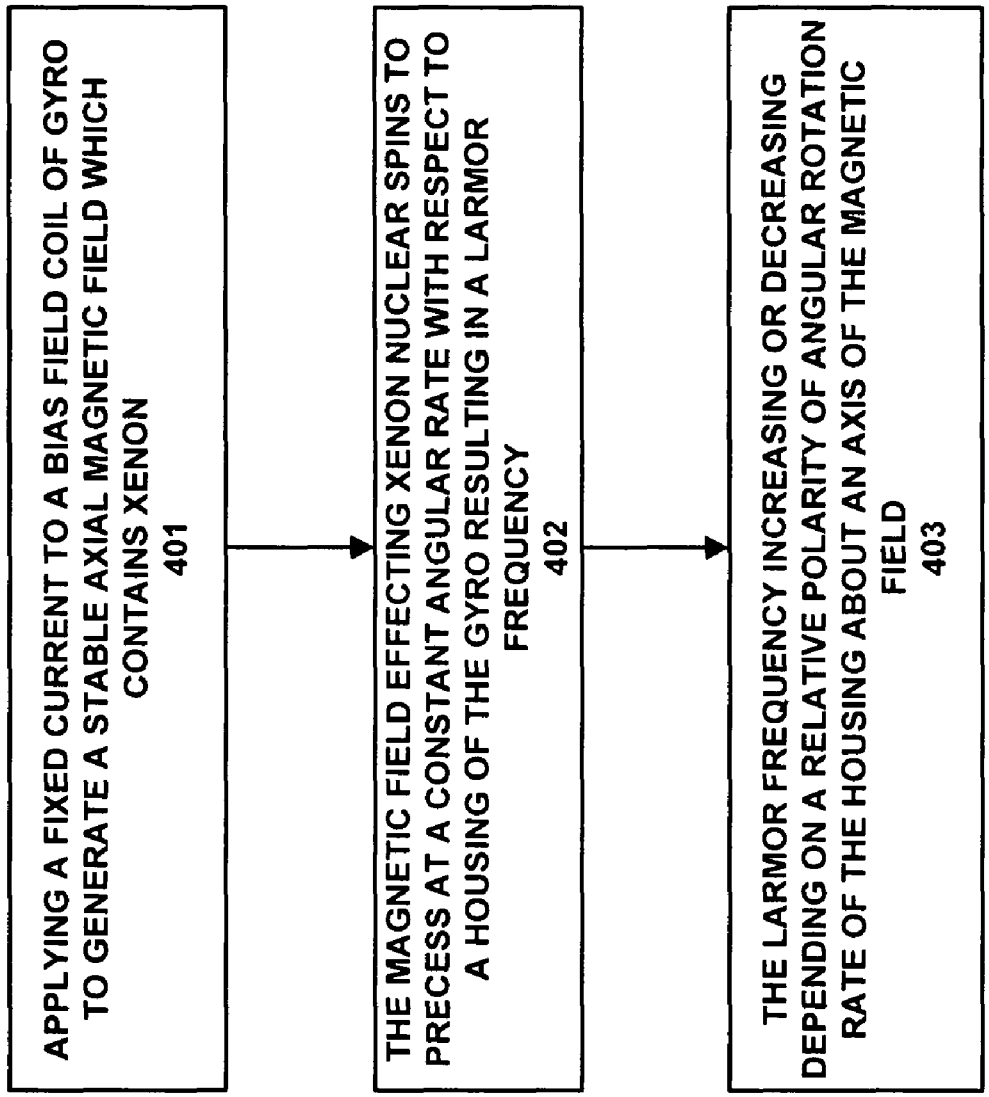

SELF-CALIBRATING NUCLEAR MAGNETIC RESONANCE GYRO

CROSS-REFERENCE TO RELATED APPLICATIONS

This application contains subject matter that is related to the subject matter of the following applications, which is assigned to the same assignee as this application.

U.S. Pat. No. 4,157,495 is hereby incorporated by reference.

TECHNICAL FIELD

The invention relates generally to nuclear magnetic resonance (NMR) gyros and, more particularly, to self-calibrating nuclear magnetic resonance gyros.

BACKGROUND

A number of approaches have been suggested in the prior art for creating a nuclear magnetic resonance gyroscope. In general, they use a nuclear magnetic resonance controlled oscillator. Rotational information is derived from the phases of the nuclear moment Larmor precession signals by phase comparison and magnetic field control circuits.

Such devices have significant problems which limit their use. For instance, some devices are limited by the relatively short relaxation times of the gases which they use. Also, typical strong direct coupling between the gases and the light, which is used for magnetic moment alignment or magnetic moment detection, limits both the relaxation times and the signal-to-noise ratio, and therefore limits usefulness of such instruments.

In a known type of gyro, the gyro bias polarity is reversed when the drive and sense axes are interchanged. This particular class of gyro is identified as Class II Coriolis Vibratory Gyro and is characterized by being inherently counterbalanced, symmetrical about the input axis and having orthogonal degenerate vibration modes. Self calibration of the gyro bias is achieved by employing two gyros to measure the angular rate and sequentially reversing the gyro bias. The sequence of data from the gyros may be processed in an algorithm to solve for the gyro biases and subtract them from the measured rate. The two self-calibrated gyro angular rate measurements are averaged to reduce the angle random walk.

Self-calibration of a gyro bias under dynamic operating conditions requires the simultaneous measurement of angular rate by, for example, a pair of Class II Coriolis Vibratory Gyros (CVG) or a single gyro with dual sensing elements. Class II CVGs have the ability to reverse polarity of the gyro bias by interchanging their drive and sense modes. An algorithm solves a set of four equations to estimate the gyro bias and subtract it from the measured angular rate. A Dual Resonator Gyro (DRG) may facilitate this simultaneous measurement of angular rate by a pair of gyros. System simulations have shown that the contribution of gyro bias uncertainty to the growth of position error of an inertial navigation system can be reduced by nearly three orders of magnitude using self calibration of gyro bias.

Gyro scale factor uncertainty is another source of error in inertial systems. The contribution to position error due to scale factor uncertainty is dependent on the magnitude of the angular rate experienced. Compensating for gyro scale factor uncertainty would further improve the performance of inertial navigation system.

There is a need in the art for improved self-calibrating nuclear magnetic resonance gyros.

SUMMARY

One embodiment of the present method and apparatus encompasses an apparatus. The apparatus may comprise: a gyro housing containing a bias field coil; a bias field coil that generates a stable axial magnetic field; Xenon contained within at least a portion of the axial magnetic field, Xenon nuclear spins processing at a constant angular rate with respect to the gyro housing in response to the axial magnetic field; wherein reversing a polarity of a current in the bias field coil reverses a polarity of the magnetic field and a polarity of the precession of the Xenon nuclear spin, and wherein a reversing of the polarity of the gyro scalefactor thereby results without reversing a polarity of the gyro bias.

Another embodiment of the present method and apparatus encompasses a method. The method may comprise: applying a fixed current to a bias field coil of gyro to generate a stable axial magnetic field which contains Xenon; and the magnetic field effecting Xenon nuclear spins to precess at a constant angular rate with respect to a housing of the gyro resulting in a Larmor frequency; the apparent Larmor frequency relative to the case increasing or decreasing depending on a relative polarity of angular rotation rate of the housing about an axis of the magnetic field.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 4 depicts one embodiment according to the present method.

DETAILED DESCRIPTION

Figure 1:
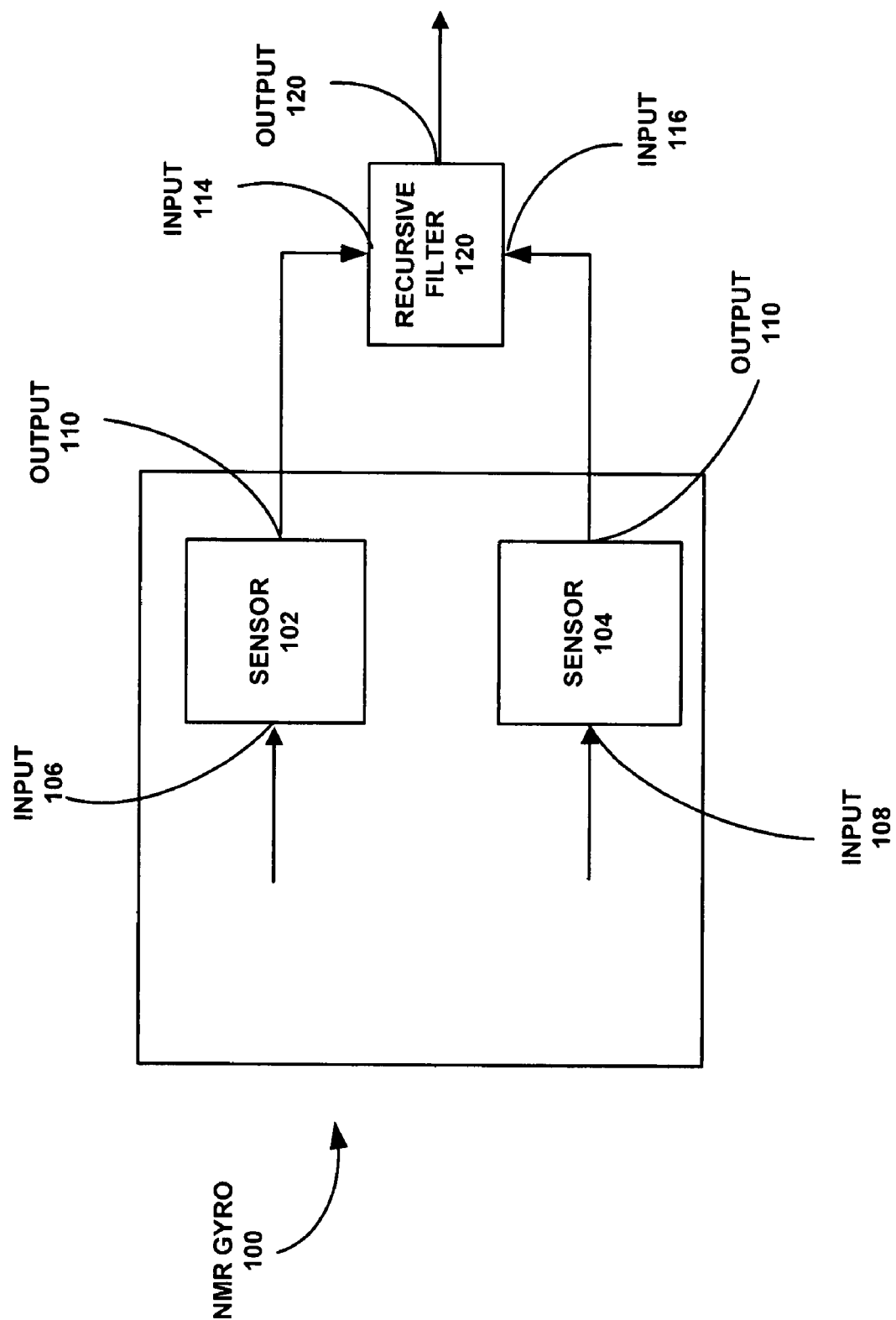
FIG. 1 is a schematic diagram of one embodiment according to the present method and apparatus.

Embodiments of the present method and apparatus provide a miniature Nuclear Magnetic Resonance (NMR) gyro that meets a need for use in small, low cost, low power, navigation-grade inertial measurement and navigation systems. A performance goal for the miniature NMR is a bias uncertainty of less than 0.01 degrees per hour. To achieve this goal, significant attention is paid to magnetic shielding and common mode rejections techniques such as multiple atomic species. While these approaches are necessary to achieve a desired performance, additional methods enhance the performance reduce risk, and increase the trade space for further reductions in size, power and cost.

In general, a gyro is a sensor that gives information about angular rate or how fast it is turning. Because the gyro's output indicates how fast an object is turning, the output signal must be integrated or added up over time. Integration involves periodically sampling the gyro with an analog to digital converter, multiplying the resulting number by the number of seconds between samples and adding it to a static variable that keeps track of the angle. It is to be understood that NMR may also be a rate sensor, and the embodiments of the present method and apparatus may be utilized for rate sensing as well as angle sensing.

Gyro bias offset, also known as zero rate output, is the measured rate when the gyro is not rotating about its sensitive axis. For example, a gyro may have a bias offset of about 5°/hr. Gyro output measurements above the bias offset indicate rotation in one direction, e.g., clockwise, while output measurements below the bias offset indicate rotation in the opposite direction, e.g., counter-clockwise.

Self-calibrating inertial sensors have been the subject of recent disclosures, patent filings and proof-of-concept demonstrations with vibrating beam and hemispheric resonator gyros. The approach to self-calibration is based on the electrical reversal of the sensors' scale factor polarity without changing the polarity or magnitude of the sensors' null offset or bias. The self-calibrating method uses electrical polarity reversal to achieve the same result as the classical method of calibrating bias in inertial sensors in which the sensors are reoriented to reverse the polarity of the input signal without changing the polarity or magnitude of the bias. In order to implement self-calibration in a dynamic environment it is necessary to have two sensors with sequentially alternating scale factor polarity. The output signals of the sensor pair may be input to a Kalman filter which derives the bias of each sensor and removes it as an error source in the estimate of the true input signal to the sensors. The Kalman filter is an efficient recursive filter that estimates the state of a dynamic system from a series of incomplete and noisy measurements. Embodiments of the present method and apparatus apply this self-calibration approach to the NMR gyro.

The scale factor polarity of the NMR gyro is determined by the polarity of the magnetic field that induces a Larmor precession of the nuclear spin of Xenon. By reversing the polarity of the magnetic field the polarity of the Larmor precession is reversed. The apparent change in the Larmor precession frequency is the measure of the angular rate applied to the gyro housing. Depending on the polarity of the Larmor precession the applied angular rate either increases or decreases the apparent precession frequency observed by the case fixed optical detector. To the degree that the gyro bias remains unchanged in polarity and magnitude following the reversal in the magnetic field, the gyro bias may be derived and removed from the measured angular rate.

Using a pair of NMR sensor elements a gyro becomes self-calibrating under dynamic operating conditions. The use of two sensors per axis also reduces the uncorrelated angle random walk by the square of two and provides redundancy. Other system architectures, such as tetrahedral geometries, using four gyros instead of six may be employed. In the tetrahedral configuration the individual gyros are sequentially reversed in polarity while the remaining three maintain continuous operation of the system.

One example of a nuclear magnetic resonance angular rate sensor or gyroscope operates by sensing inertial angular rotation rate or angular displacement about a sensitive axis of the device as a shift in the Larmor precession frequency or phase, respectively, of one or more isotopes that possess nuclear magnetic moments. The gyroscope has an angular rotation sensor and its associated electronics. The principal elements of the sensor are a light source, an NMR cell, a photodetector, a set of magnetic shields and a set of magnetic field coils. The principal elements of the electronics are signal processing circuits to extract the Larmor precession frequency and phase information and circuits to generate and control magnetic fields, both steady and varying sinusoidally with time, that are used for operating the device.

The NMR cell is mounted within a set of magnetic shields to attenuate external magnetic fields to acceptably low levels. Magnetic field coils are used to apply very uniform magnetic fields to the NMR cell. Both a steady field and an AC carrier field are applied along the sensitive axis of the device, and AC feedback fields are applied along one of the transverse axes. The DC magnetic fields along both transverse axes are controlled to be substantially zero. The NMR cell contains an alkali metal vapor, such as rubidium or cesium, together with two isotopes of one or more noble gases, such as krypton-83, xenon-129, or xenon 131. A buffer gas such as helium may also be contained in the cell.

The NMR cell is illuminated by a beam of circularly polarized light, from a source such as a rubidium or cesium lamp or a solid state laser at frequencies corresponding to absorption frequencies of rubidium or cesium, which passes through the cell at an angle with respect to the steady magnetic field. Absorption of some of this light causes the atomic magnetic moments of the rubidium or potassium atoms to be partly aligned in the direction of the steady magnetic field. This alignment is partly transferred to the nuclear magnetic moments of the noble gases, and these moments are caused to precess about the direction of the steady magnetic field, which in turn creates magnetic fields that rotate at the respective Larmor precession frequencies of the two noble gases. The rotating fields modulate the precessional motions of the rubidium or potassium magnetic moments, which produces corresponding modulations of the transmitted light, to make it possible optically to detect the Larmor precession frequencies of the two noble gases.

The modulations of the light intensity are converted into electrical signals by a photodetector, and these signals are then electronically demodulated and filtered to create signals at the Larmor precession frequencies of the two noble gases. The difference between the two precession frequencies is used accurately to control the steady magnetic field so that it is constant. One of the noble gas precession frequencies is compared to a precision reference frequency, and the resulting difference frequency is a measure of the angular rotation rate of the gyroscope.

In one embodiment a magnetic resonance device with a gas container may have an alkali metal hydride coating on the inner surface of the cell. The container may have its rotationally symmetric axis oriented at a given angle to the magnetic field, the container enclosing at least one magnetic moment gas having a nuclear electric quadruple moment.

Magnetic resonance phenomena are well understood by those of ordinary skill in the art and a variety of its practical applications in the science and engineering fields are readily available. For the purposes of this discussion, magnetic resonance includes both atomic magnetic resonance and nuclear magnetic resonance.

One particular and important application of the method and apparatus described herein is to a nuclear magnetic resonance (hereinafter referred to as NMR) angular rate sensor or gyroscope. U.S. Pat. No. 4,157,495 discloses a NMR gyroscope that operates on the principle of sensing inertial angular rotation rate or angular displacement about a sensitive axis of the device as a shift in the Larmor precession frequency or phase, respectively, of one or more isotopes that possess nuclear magnetic moments.

The gyroscope is composed of an angular rotation sensor and associated electronics. The principal elements of the sensor are a light source, an NMR cell, a photodetector, a set of magnetic shields and a set of magnetic field coils. The principal elements of the electronics are signal processing circuits for extracting the Larmor precession frequency and phase information as well as circuits for generating and controlling various magnetic fields, both steady and varying sinusoidally with time, that are necessary for the proper operation of the device.

The NMR cell is mounted within a set of magnetic shields in order to attenuate external magnetic fields to acceptable low levels. Magnetic field coils are used to apply very uniform magnetic fields to the NMR cell. Both a steady field and an ac carrier field are applied along the sensitive axis of the device and AC feedback fields are applied along one of the transverse axes. The DC magnetic fields along both transverse axes are controlled to be substantially zero. The NMR cell contains a single alkali metal vapor, such as rubidium, together with two isotopes of one or more noble gases, such as krypton-83, and xenon-129, or xenon-131. One or more buffer gases such as helium and nitrogen may also be contained in the cell. The NMR cell is illuminated by a beam of circularly polarized light that originates from a source such as a rubidium lamp and which passes through the cell at an angle with respect to the steady magnetic field. Absorption of some of this light causes the atomic magnetic moments of the rubidium atoms to be partly aligned in the direction of the steady magnetic field. This alignment is partly transferred to the nuclear magnetic moments of the noble gases, and these moments are caused to precess about the direction of the steady magnetic field, which in turn creates magnetic fields that rotate at the respective Larmor precession frequencies of the two noble gases. These rotating fields modulate the precessional motions of the magnetic moments, which in turn produce corresponding modulations of the transmitted light, thereby making it possible to optically detect the Larmor precession frequencies of the two noble gases.

The modulations of the light intensity are converted into electrical signals by a photodetector, and these signals are then electronically demodulated and filtered to provide signals at the Larmor precession frequencies of the two noble gases. The difference between the two precession frequencies is used to accurately control the steady magnetic field so that it is constant. One of the noble gas precession frequencies is subtracted from a precision reference frequency. The resulting difference frequency is a measure of the angular rotation rate of the gyroscope. The magnitude of an individual nuclear magnetic moment is extremely small and the natural equilibrium condition is one in which a nearly random orientation of moments exists in an ensemble of atoms. Techniques must be used to orient a significant fraction of these magnetic moments in a single direction so that a macroscopic magnetic moment, and consequently a measurable signal, will be produced.

FIG. 1 is a schematic diagram of one embodiment according to the present method and apparatus. A NMR gyro 100 may have two sensors 102, 104 with respective inputs 106, 108 and respective outputs 110, 112. The outputs 110, 112 of the two sensors 102, 104 may be operatively coupled to respective inputs 114, 116 of a recursive filter module 118 that has an output 120. The recursive filter 118 may, for example, be a Kalman filter.

Figure 2:
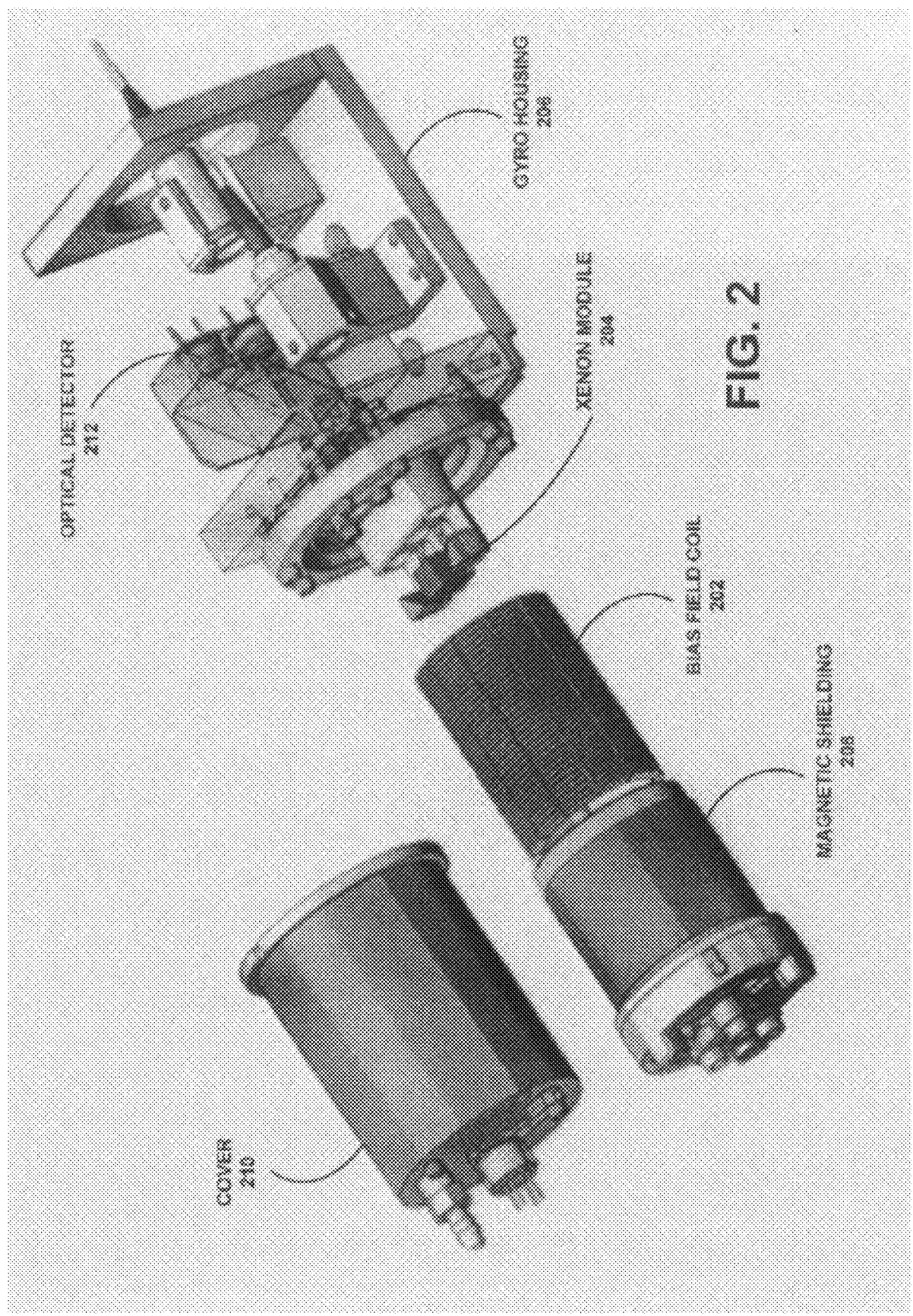
FIG. 2 is an exploded perspective view of one embodiment according to the present method and apparatus.

FIG. 2 is an exploded perspective view of one embodiment according to the present method and apparatus. A fixed current applied to the bias field coil 202 generates a stable axial magnetic field. This magnetic field causes nuclear spins of Xenon module 204 to precess at a constant angular rate with respect to the gyro housing. The Xenon module 204 may contain Xenon 129 or Xenon 131. Other materials may be used such as Kr83, He3; there is no requirement that it be a noble gas, but in general noble gases have relaxation times long enough to be very useful in the embodiments according to the present method and apparatus. This frequency of precession is referred to as the Larmor frequency. The Larmor frequency increases or decreases depending on the relative polarity of the angular rotation rate of the housing 206 about the axis of the magnetic field.

The bias field coil 202 may be contained within magnetic shielding 208 and protected by a cover 210. An optical detector module 212 is operatively coupled to the housing 206.

Reversing the polarity of the current in the coil 202 reverses the polarity of the magnetic field and the polarity of the precession of the Xenon nuclear spin. This reverses the polarity of the gyro scalefactor without reversing the polarity of the gyro bias.

Figure 3:
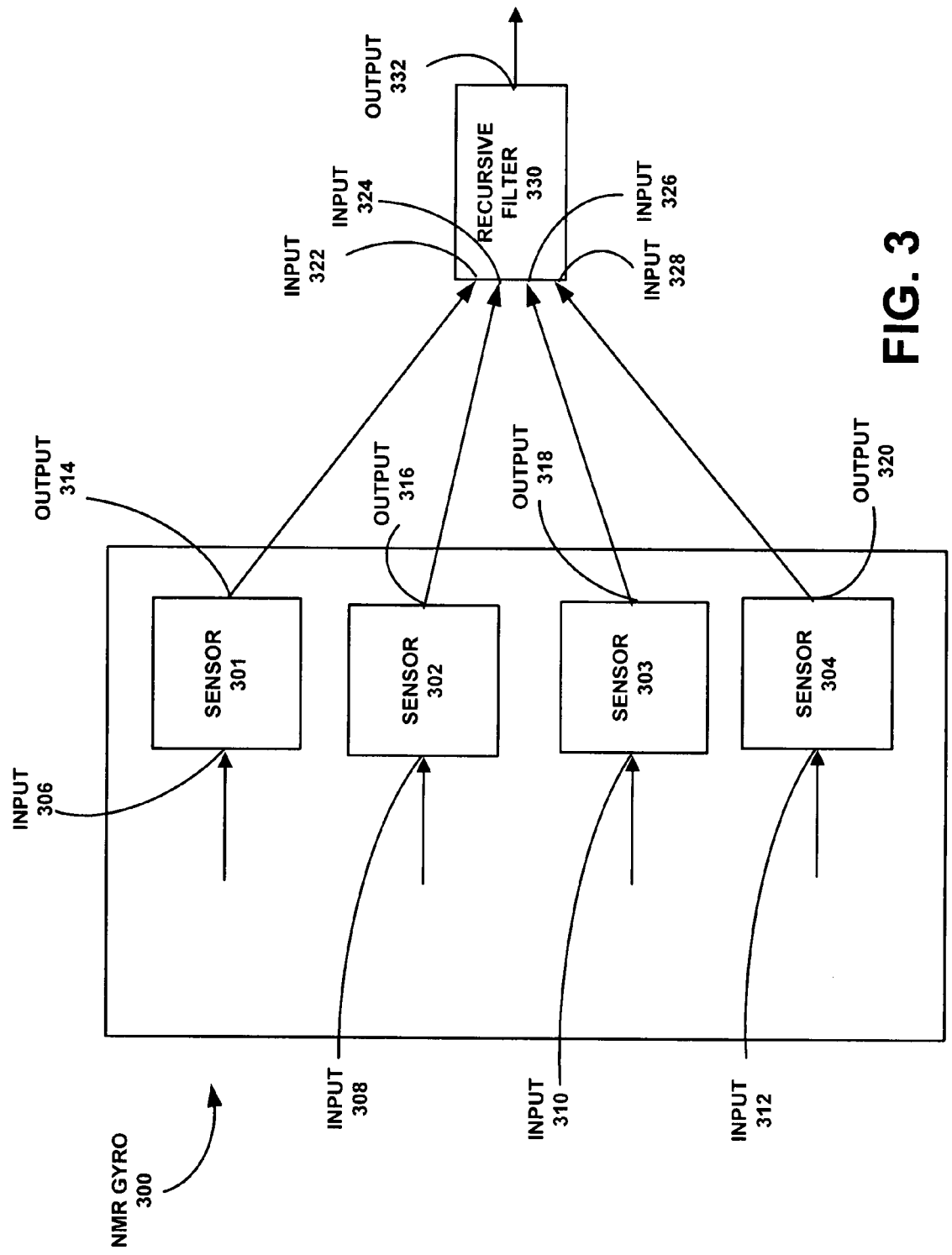
FIG. 3 is a schematic diagram of another embodiment according to the present method and apparatus.

FIG. 3 is a schematic diagram of another embodiment according to the present method and apparatus. A NMR gyro 300 may have four sensors arranged in a tetrahedral configuration 301, 302, 303, 304 with respective inputs 306, 308, 310, 312 and respective outputs 314, 316, 318, 320. The outputs 314, 316, 318, 320 of the four sensors 301, 302, 303, 304 may be operatively coupled to respective inputs 322, 324, 326, 328 of a recursive filter module 330 that has an output 332. The recursive filter 330 may, for example, be a Kalman filter.

FIG. 4 depicts an embodiment according to the present method. In general terms, this embodiment may have the following steps: applying a fixed current to a bias field coil of gyro to generate a stable axial magnetic field which contains Xenon (401); and the magnetic field effecting Xenon nuclear spins to precess at a constant angular rate with respect to a housing of the gyro resulting in a Larmor frequency (402); the Larmor frequency increasing or decreasing depending on a relative polarity of angular rotation rate of the housing about an axis of the magnetic field (403). Reversing a polarity of a current in the coil reverses a polarity of the magnetic field and the polarity of the precession of the Xenon nuclear spin.

Reversing the polarity of the current in the coil which reverses the polarity of the magnetic field and the polarity of the precession of the Xenon nuclear spin, reverses a polarity of the gyro scalefactor without reversing the polarity of the gyro bias.

The present apparatus in one example may comprise a plurality of components such as one or more of electronic components, hardware components, and computer software components. A number of such components may be combined or divided in the apparatus.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:
1. An apparatus, comprising:
a gyro housing containing a bias field coil that generates a stable axial magnetic field;
Xenon contained within at least a portion of the axial magnetic field, Xenon nuclear spins precessing at a constant angular rate with respect to the gyro housing in response to the axial magnetic field;
wherein reversing a polarity of a current in the bias field coil reverses a polarity of the magnetic field and a polarity of the precession of the Xenon nuclear spin, and wherein a reversing of the polarity of the gyro scalefactor thereby results without reversing a polarity of the gyro bias, and wherein an apparent change in frequency of precession is a measure of an angular rate applied to the gyro housing.

2. The apparatus of claim 1, wherein a fixed current applied to the bias field coil generates a stable axial magnetic field.

3. The apparatus of claim 1, wherein the magnetic field causes the Xenon nuclear spins to precess at a constant angular rate with respect to the gyro housing.

4. The apparatus of claim 3, wherein a frequency of the angular rate is a Larmor frequency.

5. The apparatus of claim 4, wherein the Larmor frequency increases or decreases as a function of a relative polarity of the angular rotation rate of the housing about the axis of the magnetic field.

6. An apparatus, comprising:
a nuclear magnetic resonance gyro having at least two sensors in a magnetic field;
the two sensors having sequentially alternating scale factor polarity, and the two sensors having respective outputs with respective output signals;
a Kalman filter having two inputs respectively coupled to the respective outputs of the two sensors, the two inputs receiving the two output signals of the two sensors;
wherein the Kalman filter derives a respective bias of each sensor and removes the respective bias as an error source in an estimate of a respective true input signal to the sensors, and
wherein the scale factor polarity of the nuclear magnetic resonance gyro is determined by a polarity of the magnetic field that induces Larmor precession of a nuclear spin of Xenon; and
wherein by reversing the polarity of the magnetic field the polarity of the Larmor precession is reversed; and
wherein an apparent change in the Larmor precession frequency is a measure of an angular rate applied to the gyro housing.

7. The apparatus of claim 6, wherein depending on the polarity of the Larmor precession the applied angular rate either increases or decreases an apparent precession frequency observed by a case fixed optical detector.

8. The apparatus of claim 7, wherein, to a degree that the gyro bias remains unchanged in polarity and magnitude following a reversal in the magnetic field, the gyro bias is derived and removed from a measured angular rate.

9. The apparatus of claim 6, wherein the apparatus further comprises a pair of NMR sensors that enable self-calibrating of the gyro under dynamic operating conditions.

10. The apparatus of claim 6, wherein the apparatus further comprises two sensors per axis to reduce an angle random walk by a square of two and to provide redundancy.

11. The apparatus of claim 6, wherein the apparatus further comprises four gyros arranged in a tetrahedral configuration, wherein individual gyros are sequentially reversed in polarity while the remaining three gyros maintain continuous operation of the apparatus.

12. The method, comprising:
applying a fixed current to a bias field coil of gyro to generate a stable axial magnetic field which contains Xenon; and
effecting, via the magnetic field, Xenon nuclear spins to precess at a constant angular rate with respect to a housing of the gyro resulting in a Larmor frequency,
the Larmor frequency increasing or decreasing depending on a relative polarity of angular rotation rate of the housing about an axis of the magnetic field, reversing a polarity of a current in the coil reversing a polarity of the magnetic field and the polarity of the precession of the Xenon nuclear spin, an apparent change in the Larmor frequency being a measure of angular rate applied to the housing of the gyro.

13. The method according to claim 12, wherein the reversing the polarity of the current in the coil which reverses the polarity of the magnetic field and the polarity of the precession of the Xenon nuclear spin, reverses a polarity of the gym scalefactor without reversing the polarity of the gyro bias.

14. An apparatus, comprising:
a gyro housing containing a means for establishing a stable axial field;
a predetermined material contained within at least a portion of the axial magnetic field, nuclear spins of the predetermined material processing at a constant angular rate with respect to the gyro housing in response to the axial magnetic field;
wherein one of reversing a polarity of a current in the bias field coil reverses a polarity of the magnetic field a polarity of the precession of the nuclear spin of the predetermined material, or directly reversing the polarity of the magnetic field to reverse a polarity of the precession of the nuclear spin of the predetermined material, and wherein a reversing of the polarity of the gyro scalefactor thereby results without reversing a polarity of the gyro bias and wherein an apparent change in a precession frequency of the precession of the nuclear spin is a measure of an angular rate applied to the gyro housing.

15. The apparatus of claim 14, wherein the apparatus further comprises a bias field coil, and wherein a fixed current is applied to the bias field coil to generate a stable axial magnetic field.

16. The apparatus of claim 14, wherein the magnetic field causes the nuclear spins of the predetermined material to precess at a constant angular rate with respect to the gyro housing.

17. The apparatus of claim 16, wherein a frequency of the angular rate is a Larmor frequency.

18. The apparatus of claim 17, wherein the Larmor frequency increases or decreases as a function of a relative polarity of the angular rotation rate of the housing about the axis of the magnetic field.

19. The apparatus of claim 14, wherein predetermined material is Xenon.

20. The apparatus of claim 14, wherein the means for generating a stable axial magnetic field is a bias field coil.

* * * * *